US 8,021,735 B2

(12) United States Patent
Tsiarkezos

(10) Patent No.: US 8,021,735 B2
(45) Date of Patent: *Sep. 20, 2011

(54) STITCHBONDED FABRIC WITH A SUBSTRATE HAVING DIVERSE REGIONAL PROPERTIES

(75) Inventor: Stephen H. Tsiarkezos, Elkton, MD (US)

(73) Assignee: Xymid, LLC, Midlothian, VA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/782,055

(22) Filed: Jul. 24, 2007

(65) Prior Publication Data

US 2008/0166532 A1    Jul. 10, 2008

Related U.S. Application Data

(60) Provisional application No. 60/883,832, filed on Jan. 8, 2007.

(51) Int. Cl.
*B32B 5/12* (2006.01)
*D05B 93/00* (2006.01)
*D05B 11/00* (2006.01)

(52) U.S. Cl. .......... 428/88; 428/105; 428/114; 112/402; 112/475.08

(58) Field of Classification Search .................. 428/105, 428/114, 88; 112/475.08, 402
See application file for complete search history.

(56) References Cited

U.S. PATENT DOCUMENTS

| | | | |
|---|---|---|---|
| 1,201,446 A * | 10/1916 | DeVoe | ........................... 112/434 |
| 3,025,196 A | 3/1962 | Burger | |
| 4,704,321 A | 11/1987 | Zafiroglu | |
| 4,773,238 A | 9/1988 | Zafiroglu | |
| 4,876,128 A | 10/1989 | Zafiroglu | |
| 4,891,957 A | 1/1990 | Strack et al. | |
| 4,998,421 A | 3/1991 | Zafiroglu | |
| 5,041,255 A | 8/1991 | Zafiroglu | |
| 5,187,952 A | 2/1993 | Zafiroglu | |
| 5,192,600 A | 3/1993 | Pontrelli et al. | |
| 5,203,186 A | 4/1993 | Zafiroglu | |
| 5,247,893 A | 9/1993 | Zafiroglu | |
| 5,288,536 A | 2/1994 | Zafiroglu | |

(Continued)

OTHER PUBLICATIONS

Deneris, Kathleen, "Layer, Stitch, and Cut for a Terrific New Fabric With a Soft Lively Texture" Threads, Oct./Nov. 1996, pp. 31-33.

*Primary Examiner* — Jenna Johnson
(74) *Attorney, Agent, or Firm* — Jeffrey C. Lew

(57) ABSTRACT

A stitchbonded fabric has a regionally segmented base layer in which one or more physical properties in at least one region is substantially different from those of another region. Typical physical properties that can differ among substrate regions include density, basis weight, chemical composition, thickness, porosity, permeability, elongation, elasticity, tensile strength, barrier properties, dyeability, abrasion resistance, and texture. The stitchbonded fabric thus has an improved combination of properties. In one aspect the base layer is discontinuous such that at least one region is devoid of all substrate material. The base layer is stitched continuously over its full extent such that all regions including open areas devoid of substrate material are stitched. The stitchbonded fabric with a discontinuous base layer advantageously can provide enhanced stretch capability to the overall fabric, especially in the cross direction and is particularly useful for stretchable skirts of mattress covers. A process for making a stitchbonded fabric includes continuously feeding substrate webs of diverse properties to a stitchbonding machine. Optionally, the webs are laterally separated or partially excised to create regions devoid of substrate material.

34 Claims, 6 Drawing Sheets

U.S. PATENT DOCUMENTS

| | | | |
|---|---|---|---|
| 5,308,674 A | 5/1994 | Zafiroglu | |
| 5,486,385 A * | 1/1996 | Bylund et al. | 428/17 |
| 5,628,097 A * | 5/1997 | Benson et al. | 28/165 |
| 5,634,997 A | 6/1997 | Anzilotti et al. | |
| 5,879,779 A | 3/1999 | Zafiroglu | |
| 6,124,001 A | 9/2000 | Sugita et al. | |
| 6,263,814 B1 | 7/2001 | O'Connor | |
| 6,280,815 B1 | 8/2001 | Ersfeld et al. | |
| 6,407,018 B1 | 6/2002 | Zafiroglu | |
| 6,423,393 B1 | 7/2002 | Wildeman | |
| 6,811,870 B2 | 11/2004 | Zafiroglu | |
| 6,821,601 B2 | 11/2004 | Tsiarkezos et al. | |
| 6,908,664 B2 * | 6/2005 | Tsiarkezos | 428/197 |
| 6,919,117 B1 | 7/2005 | Kane et al. | |
| 6,936,327 B2 | 8/2005 | Zafiroglu | |
| 7,141,290 B2 | 11/2006 | Tsiarkezos et al. | |
| 2003/0005599 A1 | 1/2003 | Panaccione | |
| 2003/0220038 A1 | 11/2003 | Tsiarkezos | |
| 2005/0196579 A1 | 9/2005 | Zafiroglu | |
| 2008/0166516 A1 * | 7/2008 | Zafiroglu | 428/102 |
| 2008/0166520 A1 * | 7/2008 | Zafiroglu et al. | 428/136 |

* cited by examiner

STITCHBONDED FABRIC WITH A SUBSTRATE HAVING DIVERSE REGIONAL PROPERTIES

This application claims the benefit of U.S. Provisional Application No. 60/883,832 filed Jan. 8, 2007.

FIELD OF THE INVENTION

This invention relates to a fabric having a substrate layer stitchbonded with multi-needle stitched threads and in which the substrate layer has multiple regions which have distinctly different physical properties from other regions. In one embodiment, the substrate has some regions occupied by substrate material and other regions devoid of all substrate material. In a specific embodiment the fabric provides a remarkably high cross directional stretch and is useful in stretchable skirts for mattress covers, among other uses.

BACKGROUND OF THE INVENTION

Stitchbonded fabrics and methods for producing them are known, as for example from K. W. Bahlo, "New Fabrics without Weaving" Papers of the American Association for Textile Technology, Inc. pp. 51-54 (November 1965). Such fabrics are made by multi-needle stitching of various fibrous substrates with elastic or non-elastic yarns, as disclosed, for example, by the Zafiroglu in U.S. Pat. Nos. 4,704,321, 4,737, 394 and 4,773,328.

Stitchbonded fabrics are versatile and have a wide variety of applications. Some fabric products, for example, covers for furniture, in particular mattress covers, call for the fabric to have good stretch and/or elastic stretch characteristics. Stitchbonded fabrics could be useful in such applications, however, many traditional stitchbonded fabrics have inadequate stretch capability. Customary stitchbonded fabrics typically have a plain and monotonously uniform appearance that can detract from a product's aesthetic appeal.

To improve stitchbonded fabric stretch, the incorporation of elastic stitching yarns has been used. Despite stitching with elastic yarns and gathering the stitched fabric in both machine direction ("MD") and cross direction ("XD") the amount of stretch of the gathered fabric has been limited. The limitations may result from the limited ability of the stitching yarns to stretch, constraint of the stitching pattern or, in respect to nonwoven substrates particularly, from the degrees of alignment and bonding of the substrate fibers. Stitching pattern limits stretch because the characteristic yarn angle of a stitchbonded fabric stitching pattern affects elongation. Yarn angle can depend upon the stitching thread counts per inch, the pattern notation, and spaces between adjacent stitches in the yarn notation. As concerns nonwoven substrate structures, parallel alignment of the fibers to high degrees (in the MD) tends to limit MD elongation and to promote fabric failure at low cross direction elongation when the nonwoven fibers are bonded to a relatively high degree. If the nonwoven fibers are aligned parallel to a lesser degree some additional XD stretch occurs but extension is limited by the interfiber bonding.

A technique known as "weft insertion" has been developed which can provide increased cross directional stretch of stitchbonded fabrics. This method entails placing weft yarns having very favorable elastic properties across the substrate layer at a location just ahead of the needle bed of the stitchbonding operation, typically with a creel system. Such a system takes yarn from a package and mechanically throws it across the substrate. A conveyor system oriented in the fabric cross direction advances toward the needle bed while holding the weft yarns in place until immediately before the yarns enter the needle bed. There the conveyor releases the entering yarn letting the warp yarns overstitch and lock the inserted wefts in place. This provides a high degree of cross directionality to the yarn and allows the resulting stitchbonded fabric to take good advantage of the yarns stretch and recovery properties. Stretch of the weft-inserted stitchbond fabric still is constrained by elastic-limiting characteristics of the underlying substrate sheet and by the overstitched pattern used to maintain inserted weft position.

Selected advances in technology of stitchbonded fabrics are documented in many patents including those of D. Zafiroglu which are presently assigned to Xymid, L. L. C., such as U.S. Pat. Nos. 4,773,238; 4,876,128; 4,998,421; 5,041,255; 5,187,952; 5,247,893; 5,203,186; 5,308,674; 5,879,779; 6,407,018; 6,821,601; and 6,908,664.

A noteworthy utility for stitchbonded fabrics having desirable XD elongation and especially elastic XD elongation is that of skirts for mattress covers. A mattress cover skirt is a band of typically stretchable fabric attached to the periphery of and suspended downward from a top panel that covers the surface of the mattress. Usually the skirt is configured such that its MD is aligned with the periphery of the panel and XD corresponds to the normally narrower width of the skirt. The skirt may have some decorative function but mainly it stretches elastically to effectively hold the cover in place on the mattress. It is desirable to have mattress cover skirts with good cross direction as well as machine direction stretch properties.

Many inventions pertaining to cover skirt technology are disclosed in various patents now assigned to Xymid, L. L. C., such as U.S. Pat. Nos. 5,636,393; 5,603,132; 6,199,231; 6,272,701; 6,842,921; and 6,883,193. The entire disclosures of all U.S. patent and patent applications identified herein are hereby incorporated by reference herein.

In addition to stretch, conventional stitchbonded fabrics can be constrained within other narrow performance parameter ranges by the use of a substrate layer that has uniform physical properties over the entire extent of the fabric. Representative physical properties that are uniform throughout the substrate layer in a traditional stitchbonded fabrics include density, composition, basis weight, thickness, porosity, chemical resistance, and texture to name a few. Because the properties of the substrate layer are the same everywhere in the fabric after stitching, the overall fabric necessarily is confined within a performance range dictated by the substrate component characteristics.

One particularly dramatic example of a limitation on the ability of a stitchbonded fabric to perform relates to the substrate layer density. Occasionally fabric designers desire to have a stitchbonded fabric that employs an extremely low density nonwoven substrate layer. In simplest terms stitchbonded fabrics are made by passing the substrate layer material usually continously through a stitching machine typically having plural needle bars each having multiple guides threaded with the stitching yarn. The substrate material is usually unwound from a supply roll and appropriately tensioned and guided by additional rolls and mechanisms for alignment and speed control. If the density of the substrate is too low, it lacks the stiffness and integrity to stand up to the unwinding and other operations preparatory to feeding into the machine. The substrate can also be too flimsy to be stitched. Consequently, the fabric with such a low density substrate cannot even be manufactured. As will be explained below, it has now been discovered that a stitchbonded fabric can be made with a substrate layer comprising regions of different density. In a particularly effective embodiment, a substrate layer having regions of ultra low density substrate along with other regions having higher density can be successfully fed to the stitchbonding machine such that the average density is very low. This novel technique can solve the problem of making very low density substrate layer stitchbonded fabrics which could not otherwise be easily fabricated in conventional machinery.

It is desirable to have a stitchbonded fabric that provides high stretch and and optionally elastic stretch especially in the cross direction. A stitchbonded fabric having superior stretch and which is simple to manufacture with only minor modifications to conventional stitchbonding equipment is also much desired. There also is a need for making a stitchbonded fabric stretchable in an aesthetically pleasing manner and with overall strength and structural integrity. Yet further there is a desire to have a stitchbonded fabric that advantageously provides physical properties which are different in different regions of the fabric. Additionally it is wanted to have stitchbonded fabrics that present highly decorative designs and varied appearance features without resorting to complicated and expensive stitching yarns and stitching patterns.

SUMMARY OF THE INVENTION

Accordingly, the present invention broadly provides a novel stitchbonded fabric by stitching a base layer. The substrate material that forms the base layer preferably is a nonwoven fibrous structure. The base layer is constituted by a plurality of coplanar regions and the substrate material in each region is independently selected primarily to contribute one or more characteristic properties to the completed stitchbonded fabric. The composition of the regions is selected such that the magnitude of at least one physical property of one or more regions is substantially different from the magnitude of the corresponding physical property of at least one other region. A pattern of stitching, preferably a uniform stitching pattern, is present over the full extent of the base layer. In an important aspect one or more regions are completely devoid of substrate material and the stitching thus provides stitched-over areas where the stitches penetrate substrate material and stitched open areas where the stitches are made in the substrate-free regions.

The present invention therefore provides a stitchbonded fabric defining a machine direction and a cross machine direction perpendicular to the machine direction, comprising (A) a base layer comprising (i) a first region comprising a first substrate material which exhibits physical properties, and (ii) a second region coplanar with the first region and which exhibits at least one physical property quantitatively substantially different from a corresponding physical property of the first substrate material, and (B) a stitching pattern of threads multi-needle stitched throughout the base layer in rows of stitches running in the machine direction, the rows being spaced apart in the cross direction.

The invention also provides a stitchbonded fabric defining a machine direction and a cross direction perpendicular thereto, the fabric being formed by the process comprising the steps of (A) providing one or more webs of substrate materials, (B) forming a base layer comprising coplanar regions in which one or more of the regions comprises at least one of said webs such that a physical property of at least one region is different from that of a second region, (C) providing threads to be stitched into the base layer, and (D) multi-needle stitching throughout the extent of the base layer with at least one pattern of the threads in rows of stitches running in a machine direction and spacing the rows apart in a cross direction, thereby forming the stitchbonded fabric.

Still further there is provided a process for making a stitchbonded fabric comprising the steps of (A) continuously feeding into a multi-needle stitching machine a base layer comprising one or more webs of substrate material such that the base layer is segmented into regions having at least one characteristic physical property, and such that the value of the characteristic physical property of at least one region is substantially different from that of another region, and (B) multi-needle stitching throughout the extent of the base layer in rows of stitches running in the machine direction, the rows being spaced apart in a cross direction perpendicular to the machine direction, thereby producing the stitchbonded fabric.

In a preferred aspect this invention also provides a stretchable stitchbonded fabric defining a machine direction and a cross direction perpendicular thereto, comprising a discontinuous base layer having at least one substrate region occupied by a web of nonwoven fabrics of fibers of textile decitex and at least one non-substrate region devoid of any substrate, and at least one stitching pattern of threads multi-needle stitched extending over the base layer in rows of stitches running in the machine direction, the rows being spaced apart in the cross direction, in which the fabric defines at least one stitched-over substrate area where the threads stitch the substrate region, and at least one stitched open area where the threads stitch the non-substrate region, and in which the stitchbonded fabric has stretch in the cross direction at least 20% greater than stretch in the cross direction of the stitched-over substrate area.

DETAILED DESCRIPTION OF THE INVENTION

Figure 1:
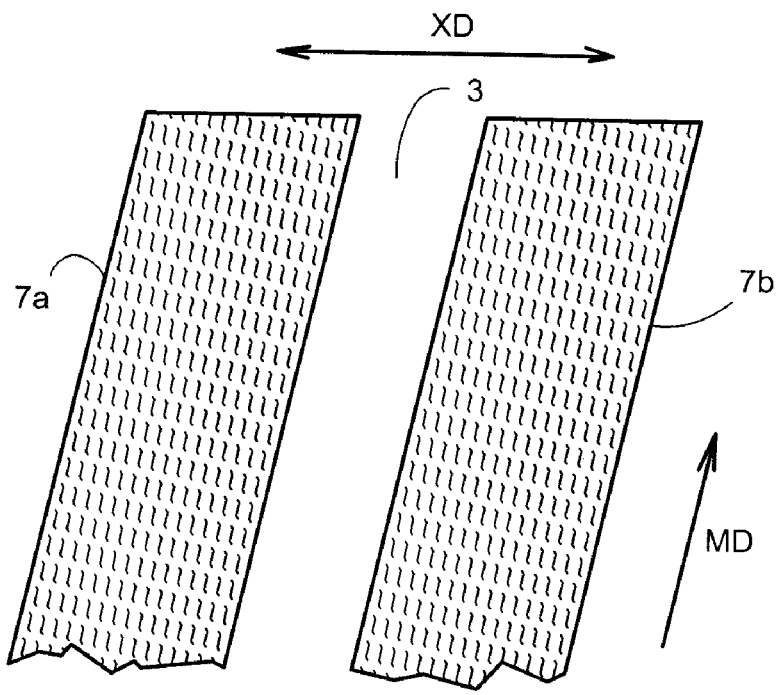
FIG. 1 is a perspective view of a discontinuous base layer suitable for incorporation in an embodiment of the stitchbonded fabric according to this invention.

Traditionally, the term "stitchbonded" refers to the result of a multi-needle stitching operation performed on a base layer of a web of substrate material. According to this invention, the base layer of the stitchbonded fabric comprises multiple regions of substrate material having diverse physical properties. That is, the physical properties of one region of the base layer are different from those in at least one other region. Two or more regions may be composed of the same material such that those regions exhibit identical substrate material physical properties. An example of this situation occurs when the base layer includes strips "A" and "B" oriented lengthwise in the machine direction and positioned in the cross machine direction in the sequence A/B/A where the strips of substrate material A have one set of properties and the strip of substrate material type B has another set of properties.

The physical properties of the substrate materials which define the different regions of the base layer are substantive properties that characterize the functionality and/or aesthetics of the substrate material. For example, physical properties that can distinguish one region material from another include density (i.e., mass per unit volume), basis weight (i.e., mass per unit area), chemical composition, thickness, porosity, permeability, elongation, (i.e., stretch capability), elasticity, tensile strength, barrier properties, dyeability, abrasion resistance, texture and the like. Coloration of different regions is not deemed to be a substantive property (i.e., mere color diversity of regions is not considered to be a differentiating property according to this invention.

The magnitude of the difference of a property that distinguishes regions should be significant. The amount of difference between properties that renders regions substantially different from other regions will largely depend on the property and the function of the fabric. Preferably a property of a region is deemed to be significantly different from that of another region if the value of the property is at least about 10% greater in one region than the other region. In some embodiments, the values of the property of the significantly different regions can differ by at least about 20%, 30% or 50%. Moreover, to achieve the beneficial effects of this invention preferably at least about 0.5%, and more preferably at least about 1% of the area of the base layer should have a significantly different physical property than other areas. Typically the area of at least one region of significantly different physical property from other regions can be about 2-50%, sometimes 5-30% and sometimes 10-20% of the total base layer area.

The meaning of the term "fiber" includes staple fiber (i.e., finite length filament) and continuous filament. The term "textile decitex" means fibers in the range of 1 to about 22 dtex. The fibers can comprise naturally occurring materials, synthetic organic polymers, and mixtures thereof.

To prepare stitchbonded fabrics in accordance with the present invention, conventional multi-needle stitching equipment, having one or more needle bars, can be employed. In the stitching step, spaced apart, preferably parallel rows of stitches are formed in the base layer, the rows extending along the length of the fabric which usually corresponds to the so-called "machine direction" or "MD", i.e., direction of travel of the fabric through the stitching machinery. The width of the fabric usually corresponds to the direction across the machine and perpendicular to the MD, which is referred to herein as the cross direction or "XD". The stitching pattern or patterns are uniform on the whole area of the base layer. That is, the base layer having distinct regions of substrate material with diverse physical properties is fed into a stitchbonding machine. The stitching pattern is preferably uniform in the XD such that the thread patterns are uniformly stitched throughout the fabric.

Many types of substrate material such as textile or cellulosic fibrous web, (i.e. cloth or paper) and non-fibrous webs such as polymeric film or metal foil, are suitable for use in the base layer of this invention. In preferred embodiments the substrate material is a fibrous web and can be a nonwoven, woven, knit, or composite fabric of nonbonded fibers. Representative of suitable substrate materials are batts of carded fibers, air-laid fiber batts, nonwoven sheets of continuous filaments, lightly consolidated or lightly bonded spunbonded sheets, sheets of hydraulically entangled fibers, and the like. The base layer substrate material can be a monolithic fibrous structure, that is having only a single stratum composition. It is also contemplated that the substrate material can comprise a plurality of strata having different compositions, thicknesses, densities and similar characteristics. Each stratum can be selected to contribute desired physical properties such that the assembly of strata cumulatively provides quality such as thickness, weight, permeability, dyeability and the like, uniquely tailored to the end use application.

Substantially any strong thread or yarn is suitable for the stitching. The terms "thread" and "yarn" are used herein interchangeably to mean a single continuous strand of one or more plies of fiber. The stitching thread can be stretchable or non-stretchable. The terms "stretch", "stretchable" and "stretching" herein refer to the incremental elongation to which a fiber, filament, yarn or fabric can extend under specified tension without incurring substantial structural damage. In present context, a fiber, filament, yarn or fabric is considered non-stretching if its incremental elongation is less than about 3% of the object's corresponding pre-tensioned dimension. The stitching thread, if stretchable, optionally also can be elastic. The terms "elastic", "elasticity", "elastically" herein refer to the property of a fiber, filament, yarn or fabric to stretch when under tension and then, when the tension is released, to recover rapidly to nearly its original length.

Conventional elastic yarns, such as bare or covered yarns of spandex or rubber, and textured stretch yarns of nylon or polyester or other synthetic polymers, are well suited for use in the fabrics of the invention. A preferred stitching thread is a spandex elastomeric yarn that has high elongation (e.g., 300-800%) and high retractive power. As used herein, the term "spandex" has its conventional meaning, that is, a manufactured fiber in which the fiber-forming substance is a long chain synthetic polymer comprised of at least 85% of a segmented polyurethane. Such preferred yarns are available commercially (e.g., "Lycra" spandex yarn sold by Invista North America S.A.R.L., Wilmington, Del.).

The stitching thread can also comprise elastic combination yarn. The term "elastic combination yarn" refers to a yarn having a first component of elastic fiber combined with a second component of non-elastic (i.e., occasionally called "hard") fiber. The elastic-filament content of the combination yarn can be within a wide range. The elastic-filament content can amount to as much as 60% percent of the total weight of the combination yarn. More typically, the elastic fiber content is in the range of 2 to 20% of the total weight of the yarn and a content of 3 to 8% generally is preferred for reasons of cost. Usually, the combination yarn is a bulky yarn that is capable of a considerable elastic stretch and recovery. Typical elastic combination yarns for use in the present invention have a recoverable elongation in the range of 50% to 250%, or even higher. Preferably spandex fiber is the elastic component of elastic combination yarns for use in this invention. Known techniques can be used to combine the component fibers such as air-jet entangling, air-jet intermingling, covering, plying and the like.

The stitch density range acceptable for the invention is within the knowledge of one of ordinary skill in the art in view of the present disclosure. Typically, the number of rows of stitches across the width of the fabric (i.e., in the cross direction) that are inserted into the base layer by the multi-needle stitchbonding machine is in the range of about 1 to 10 per centimeter. Common conventional needle bars, for example, 6-gauge, 12-gauge, 14-gauge and 28-gauge are suitable. The number of stitches along the length of each row is usually also in the range of 1 to 10 stitches per cm.

The stitch-bonding can be performed with conventional multi-needle stitching equipment, such as "Arachne", "Liba" or "Mali" (including Malimo, Malipol and Maliwatt machines). Such machines and some fabrics produced therewith are disclosed by K. W. Bahlo, "New Fabrics Without Weaving", Paper of the American Association for Textile Technology, Inc., pages 51-54 (November, 1965), by Ploch et al, U.S. Pat. No. 3,769,815, by Hughes, U.S. Pat. No. 3,649,428 and in Product Licensing Inex, Research Disclosure, "Stitchbonded products of continuous filament nonwoven webs", page 30 (June 1968).

In a broad sense, this invention advantageously provides a stitchbonded fabric with functional and/or aesthetic properties resulting from the combination of different physical properties and relative positioning of the individual component substrate materials in the base layer. For example, a stitchbonded fabric intended to be subjected to excessive abrasive wear in localized areas can be formed of a substrate having regions of different abrasion resistance. That is, the parts of the finished fabric that will not be exposed to great abrasion can utilize a more economical, less abrasion resistant substrate material such as a highly bonded, high speed spun, high density, generally flat, spunbonded nonwoven web, and the abrasion-prone parts can have a comparatively highly abrasion resistant substrate material such as lightly bonded, low speed spun, high loft, carded nonwoven web. The less abrasion resistant and highly abrasion resistant substrate materials are juxtaposed appropriately in coplanar regions and the assembled substrates are fed into a stitchbonding machine such that the extent of the base layer constituted by the combined substrate materials is stitched by stitchbonding yarns to yield the fabric. Optionally additionally or alternatively to selecting substrate materials of different intrinsic abrasion resistance in this example, one can use a greater thickness of the less abrasion resistant material in the base layer at positions of expected high abrasion exposure. The greater thickness can be achieved by using a single and thicker layer of the less abrasion resistant material or multiple, thinner sublayers of the less abrasion resistant material. Instead of or in addition to abrasion resistance, the different regions of substrate material can have any different desired physical properties such as mentioned above to provide the finished stitchbonded fabric with a unique combination of such properties overall and in preselected locations on the area of the fabric.

In a preferred aspect this invention relates to providing a desired amount of XD stretch in a stitchbonded fabric with threads stitched through a base layer of substrate material having nonuniform innate stretch capability in the XD. The base layer is thus said to exhibit "variable stretch" or "nonuniform stretch". The variable stretch is provided by composing the base layer with distinctly different regions positioned laterally adjacent in the XD, For example, a tightly woven fabric strip having a low innate stretch characteristic can be placed alongside a loosely knit fabric strip having a higher innate stretch characteristic. Together the woven fabric substrate material and the knit fabric substrate material constitute the base layer of the stitchbonded fabric. Variable stretch can also be provided by structuring the regions from materials having different compositions, thicknesses and/or basis weights. Thus by way of another example, one base layer region can be a single layer of a first substrate material and another base layer region can be two, three or more layers of the first substrate material.

Usually the regions of different properties are oriented in machine direction bands and positioned adjacent in the cross direction. It is not necessary to affix the adjacent bands of differing regional substrate materials to each other before stitchbonding the base layer. Rather it is preferred to not affix the regions prior to stitchbonding. During fabrication of the stitchbonded product, stitchbonding threads will be inserted according to a pre-selected stitching pattern in conventional manner across the full width of the base layer. Therefore stitchbonding will bridge across the boundaries where adjacent regions abut and consequently the stitching threads will seamlessly bind the regions into an integrated fabric. If the adjacent regions are affixed before stitching, the agent for joining the regions is likely to be an adhesive and/or a mechanical (e.g., sewn) joint which can create a bulky and/or aesthetically undesirable seam.

When such variable stretch base layer is stitchbonded, the resulting fabric will have an XD stretch that is intermediate in amount between the stretch of the similarly stitchbonded individual region substrates alone. Thus for example, stitchbonding a filmy, light weight and thus highly stretchable nonwoven substrate band "A" in a stitchbonding machine alongside a less stretch capable substrate band of heavy weight highly inter-fiber bonded nonwoven "B" yields a fabric having cross direction stretch greater than that of stitchbonded B alone and less than stitchbonded A alone.

In another preferred embodiment the phsyical property of the base layer that differs between regions is density. In accord with this invention it is possible to provide a stitchbonded fabric having nominal density in certain selected regions of the fabric area and higher than nominal density and/or lower than nominal density in other regions. The resulting product will have higher density in preselected regions and lower density in other regions. Overall the density of the whole stitchbonded fabric will be intermediate to those of the individual regions.

This aspect of the invention advantageously features the particular ability to manufacture a stitchbonded fabric of a very low weight or density that could only be made conventionally with great difficulty if at all. That is, a particular end use application such as a filter material might call for a light stitchbonded fabric of a very low density fibrous nonwoven substrate. The very low density substrate is such low density that it cannot be stitchbonded directly when fed alone into a conventional stitching machine. Typically nonwovens having a weight of less than 0.3 oz./sq. yd. are too light to process in a conventional stitchbonding machine. The tension applied to draw the fibrous nonwoven substrate into the stitching machine tears the base layer prior to entry and/or jams the throat of the stitching machine. This problem is solved by replacing the uniformly light weight substrate with plural MD-oriented nonwoven strips of different weights or densities. One or more of the strips can have density lower than or about the same as that of the initial, very low density fibrous nonwoven substrate. Other strips have higher density. The higher density is chosen such that when the lower density strips are fed alongside in the XD the higher density strips, the assembly of different density strips can readily feed into the stitchbonding machine. Stitching threads hold the strips together as a unit in the stitchbonded fabric. The product fabric includes the very low density material which is suitable for the intended end use application. This technique of using substrate regions of different weights or densities also can provide a stitchbonded article having unique and aesthetically pleasing appearance effects not achieved by a uniform base layer of substrate material.

In a particularly preferred embodiment, the substantial difference of physical properties, especially the variable stretch or variable density of the fabric, is achieved by utilizing a discontinuous base layer. By "discontinuous base layer" is meant that the substrate material is completely absent from at least one region of the base layer and does exist at other regions. Regions of the base layer where the substrate material is present are named "substrate regions". Regions of the base layer devoid of substrate material are named "non-substrate regions". Typically the non-substrate region of the base layer is created by excising part of the substrate material prior to stitchbonding or by feeding disjointed pieces of substrate material separated by gaps into a stitchbonding operation. These techniques will be further explained in the discussion and examples, below.

Stitching by the stitchbonding yarns occurs over the extent of the discontinuous base layer such that the stitching is through the substrate regions and the non-substrate regions. Therefore, the stitching yarns stitch through the substrate material in the substrate regions and stitch through open space in the non-substrate regions. The area of the stitchbonded fabric occupied by a substrate region comprises substrate material and stitches of stitching yarns that penetrate the substrate material. Such area is occasionally referred to as a "stitched-over substrate" part. The area of the stitchbonded fabric comprising stitching yarns stitched through the non-substrate regions of the base layer and free of substrate is referred to as the "stitched open" part. Only stitchbonding yarns are present in the stitched open part.

It can be seen that by strategic juxtaposition of one or more substrate regions and one or more non-substrate regions, and with optional use of suitable stretchable or elastic stitching yarns, a stitchbonded fabric that exhibits remarkably higher cross direction stretch or elastic stretch can be obtained than would result if the fabric consisted only of a stitched-over substrate of same substrate and comparable stitchbonding density. Because the stitched open regions are constituted only by stitches of stitching yarns, they are not constrained against cross direction extension by substrate material. Therefore, even with non-stretchable and non-elastic stitching yarns, these regions can stretch to greater extent, especially in the cross direction, than stitched-over substrate regions. The stretch is generated by play between the yarns from slackness intrinsic to the stitch geometry and the stitching pattern utilized. That is, the stitched open fabric regions can expand and contract much like a knit fabric reversibly expands under tension due to the loop structure of the knit. Accordingly, a stitching pattern with few stitches per unit length will usually provide a higher stretch than a more closed pattern with a larger number of stitches per unit length.

Elastic stretch of the stretchable fabric can be achieved by utilizing elastic stitching yarns. As mentioned, stretch of the stitched over substrate portion is limited by presence of the substrate material and the stitched open regions are not so constrained. Accordingly, overall stretch of non-substrate regions stitched with elastic yarns can be improved to extraordinarily high values.

To achieve the benefits of this invention, the regions of substrate material having different physical properties should be positioned strategically. For example, to obtain superior XD direction stretch, the stitchbonded fabric should have a stitched open region in the area where enhanced cross direction stretch is desired. Better under-standing of this invention can be had with reference to the drawing figures. The following discussion of the figures is in context of a discontinuous base layer, i.e., a base layer having substrate regions and non-substrate regions and in which the primary objective is to achieve enhanced XD direction stretch. The drawings are also generally applicable to the aforementioned embodiments of this invention in which regions of the base layer are occupied by substrate material having different physical properties.

Figure 2:
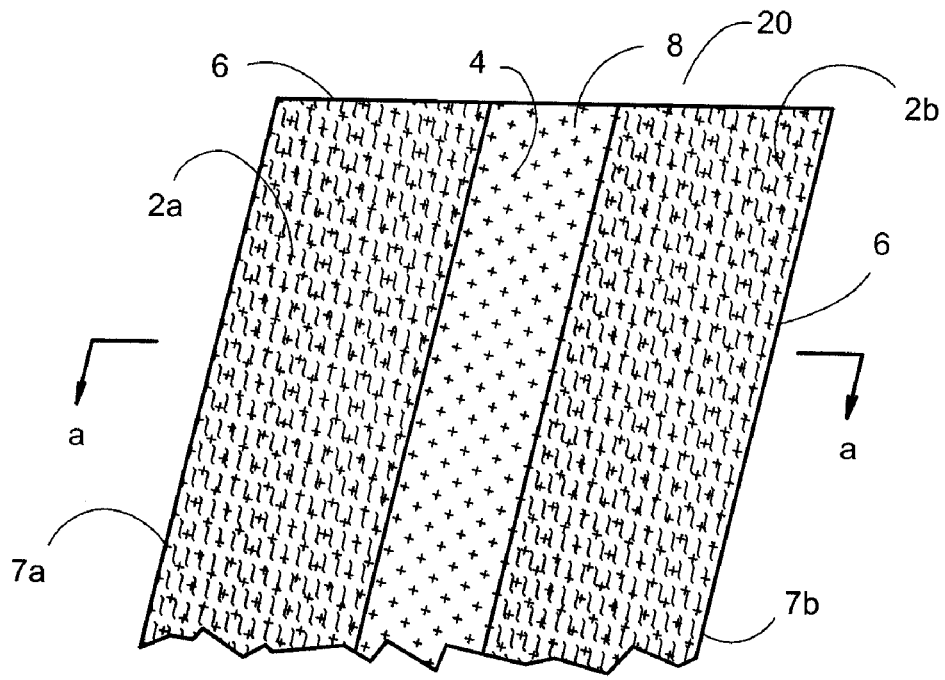
FIG. 2 is a perspective view of a stitchbonded fabric which has been formed by stitching through the discontinuous base layer of FIG. 1 according to this invention.

FIG. 2. shows an embodiment of the novel stitchbonded fabric 20 formed of a base layer comprising two strips 7a and 7b of a substrate web material 6. FIG. 1 shows the relative position of the strips prior to stitchbonding. The strips are spaced apart in the cross direction XD. There is an open space 3 between the them. Fabric 20 is produced by feeding the strips in parallel orientation in the machine direction MD separated by space 3 into a stitchbonding machine. The combination of strips and open space constitute a discontinuous base layer in which the strips 7a,7b are substrate regions and the intermediate space 3 is the non-substrate region of this embodiment. During stitchbonding, yarns 8 are stitched across the extent of the base layer in the XD. The resulting product consists of stitching yarns 8 stitched through stitched-over substrate region 2a of stitched web strip 7a, stitched open region 4, and stitched-over substrate region 2b of stitched web strip 7b. From FIG. 2 it is seen that all cross direction sections of the web a-a intersect with at least one non-substrate area. Hence enhanced cross direction stretch results when the regions are positioned such that a section of the base layer taken in the cross direction passes through a non-substrate region.

Many geometric variations of non-substrate region relative to substrate region are contemplated to provide enhanced cross direction stretch tailored to particular utilities. For example, FIG. 2 illustrates an embodiment in which the stitched-over regions are all of uniform width in the XD direction and are parallel in the MD direction. The stitchbonded fabric 20 will have a high cross direction stretch that is uniform at all locations along the machine direction.

Figure 3:
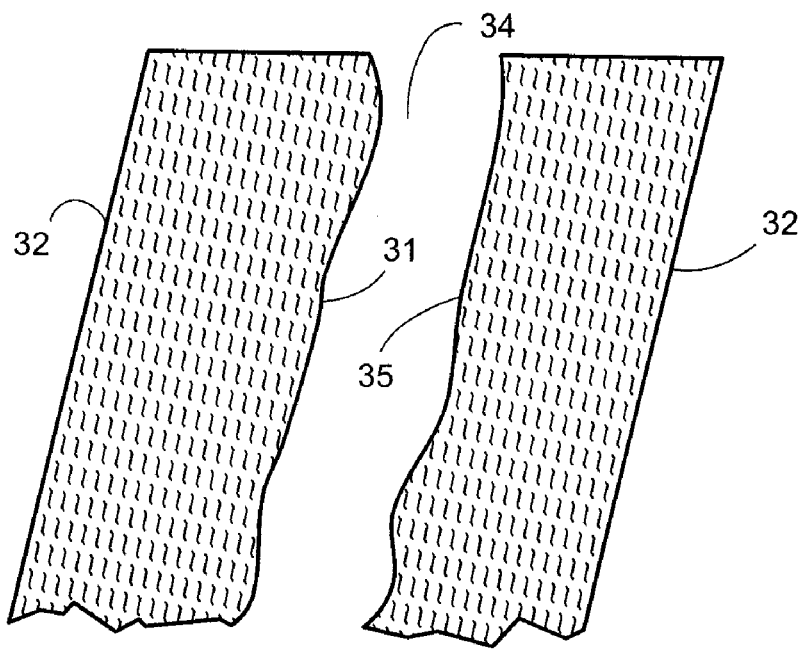
FIG. 3 is a perspective view of a discontinuous base layer suitable for incorporation in another embodiment of the stitchbonded fabric according to this invention.
Figure 4:
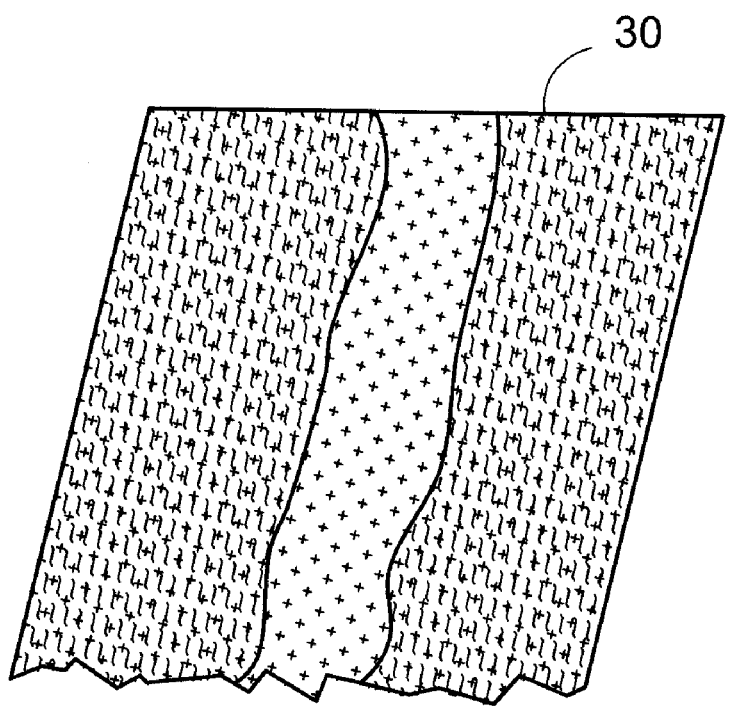
FIG. 4 is a perspective view of a stitchbonded fabric which has been formed by stitching through the discontinuous base layer of FIG. 3 according to this invention.

FIG. 4 shows another embodiment of stitch-bonded fabric 30 in which the degree of cross direction stretch varies irregularly with position in the machine direction. The discontinuous base layer for fabric 30 is shown in FIG. 3. In this fabric, the substrate strips have irregular widths in the XD direction which are defined by their facing edges 31, 35. The space 34 between the two substrate regions 32 defines the non-substrate region. It also has irregular width. Because the cross direction stretch varies approximately in proportion to the width of the stitch open area, all other conditions being equal, the amount of stretch variation will be different at different MD positions of this fabric. Accordingly it is a general rule of thumb that fabrics which have greater fractions of the cross direction dimension coincident with stitch open area will have greater XD stretch than fabrics of otherwise similar composition with lesser fractions of such dimension.

The embodiments of FIGS. 2 and 4 have been explained as being made by feeding separate strips of substrate material into a stitchbonding machine with a space between the strips. Another contemplated technique for creating a discontinuous base layer for the novel stitchbonded fabric is excising selected portions of a web of substrate material. The excision occurs prior to stitchbonding the substrate material in the substrate and non-substrate regions. By way of example, to form the fabric seen in FIG. 2 in this manner, a continuous web of substrate material can be fed continuously such as by unrolling stock material wound on a core to a stitchbonding machine. Between unrolling and feeding, the web can be slit at two XD positions intermediate the outer edges of the stock material. As the stock moves in the MD, the slits form a propagating strip therebetween. The strip is pulled from the stock before the remainder of the web enters the machine. This process is explained in greater detail, below.

Figure 5:
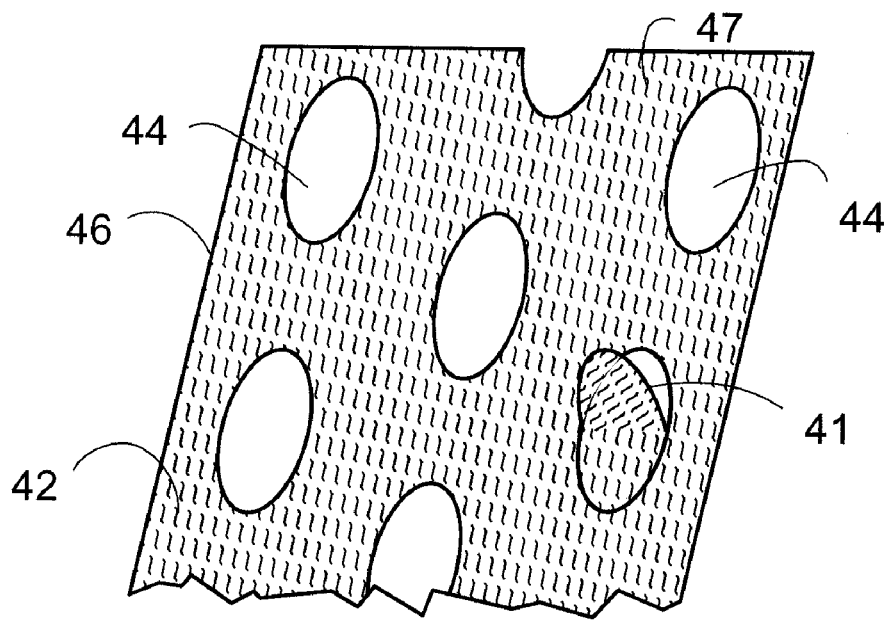
FIG. 5 is a perspective view of a discontinuous base layer suitable for incorporation in another embodiment of the stitchbonded fabric according to this invention.
Figure 6:
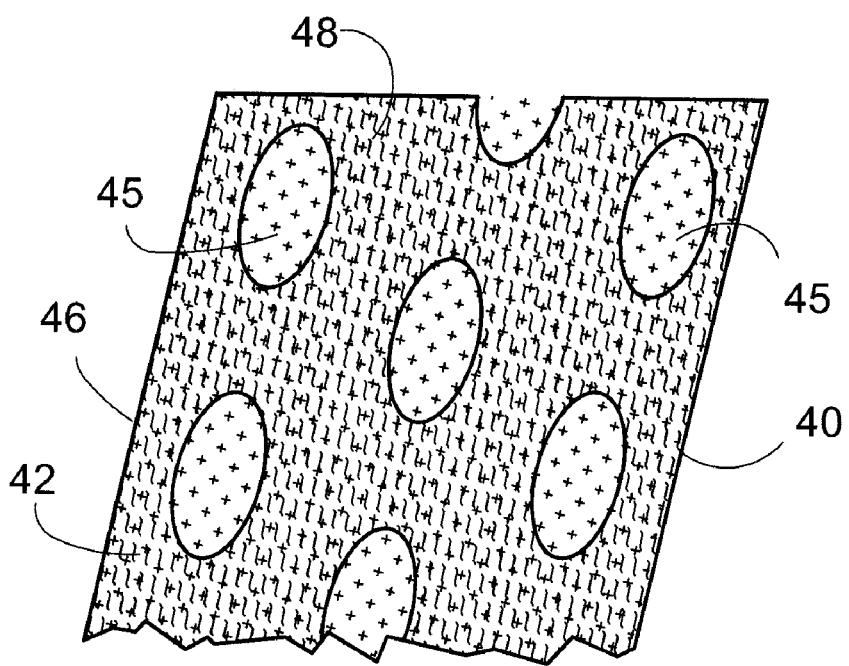
FIG. 6 is a perspective view of a stitchbonded fabric which has been formed by stitching through the discontinuous base layer of FIG. 5 according to this invention.

FIGS. 5 and 6 illustrate yet another embodiment of this invention formed by excision of selected portions of the substrate material prior to stitchbonding. In this embodiment, fabric 40 is formed by cutting out swatches 41 from a sheet 46 of substrate web material 47. This forms a plurality of isolated open areas 44 in a geometric configuration resembling that of Swiss cheese. The swatches can be conveniently excised by die-cutting or other conventional technique. The web 46 is then stitched throughout by threads 48 to produce the fabric having a single stitched-over substrate region 42 and multiple stitched open regions 45. It is noted that the non-substrate regions are positioned in the MD such that every section line in the cross direction passes through at least one non-substrate region. Consequently, at least some cross directional stretch enhancement is obtained at all positions along the MD of the fabric.

In view that XD stretch is increased in cross-sections of the stitchbonded fabric where a stitch open area constitutes at least part of the width, it is further contemplated that the novel fabric has some of both stitched-over substrate area and stitch open area at all sections taken through the fabric in the cross direction. The fraction of the XD width that extends through stitch open area is expected to be within the range of about 0.5% to 90%, and preferably 1 to 20%. A complementary fraction should extend through stitched-over substrate area. If the width of the stitch open area is too small, cross direction stretch will not be much increased over that of traditional stitchbonded fabric. If the stitch open area width is too large, the fabric will lose benefit of the properties of the substrate material.

In another aspect it is contemplated that the stitchbonded fabric according to this invention can be further tailored to the user's needs by choosing different substrate materials for different regions of the base layer. Thus, for example, the substrate material of strip 7a (FIG. 2) can be of different chemical composition and/or physical structure from the coplanar substrate material of strip 7b.

The novel fabric has the very advantageous feature that it couples a cross directionally stretchable panel with a stitchbonded fabric such that there is no seam-like irregularity of structure at the transition between the stitched-over substrate area and the stitch open area. One flows smoothly into the other. This contrasts starkly with conventional methods of panelling fabrics such as those in which adjoining panels are attached by sewing threads or adhesive, for example. Such conventional techniques typically produce a perceptible bead at the border between the joined panels. No such seam is evident in the novel fabric and this provides a very desirable, aesthetically pleasing appearance.

Another advantageous feature of this invention is that increased cross direction stretch capability can be provided to a stitchbonded fabric with little change to existing fabrication equipment. Consequently, the cost to make the improved product is quite comparable to that of traditional stitchbonds. The difficulty of attaching cross direction stretchable panels, for example by sewing or gluing, to conventional stitchbond fabric panels is obviated by forming the stretchable panel in situ with the stitchbond.

Figure 7:
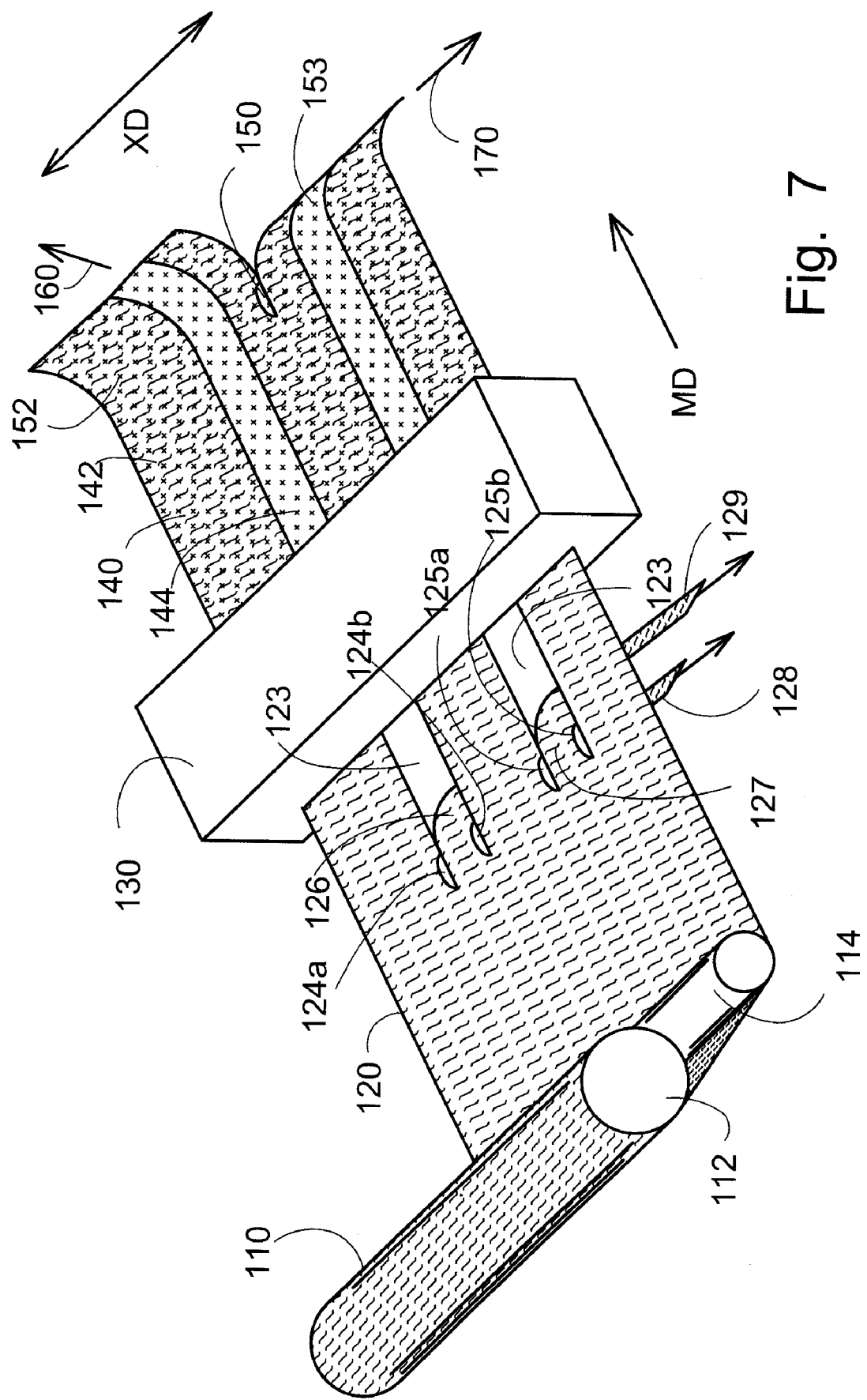
FIG. 7 is a perspective schematic view of an apparatus in the process of making a stitchbonded fabric according to the present invention.

An apparatus illustrating a representative process according to an embodiment of this invention is shown schematically in FIG. 7. A substrate material web 110 is supplied as a roll wound on core 112. The web is re-directed by roll sub-system 114 to feed continuously into stitchbonding machine 130. Upstream of the stitchbonder at 120 the web is a single piece construct extending across the width of the mouth of the machine in direction XD. Pairs of knives 124a, 124b, and 125a, and 125b, cut the web in the machine direction to form strips 126 and 127, respectively. These strips are removed from the web 120 and the tails 128 and 129 are withdrawn as waste for disposal or some other use. The web in parallel sections separated by voids 123 that were created by removing excised strips proceeds into the stitchbonding machine 130. In the machine the web is needled with multiple bars of stitching threads (not shown). The stitchbonded fabric continuously discharges from the stitchbonding machine in the MD as a unitary piece integrated by stitches 140. These stitches are coextensive with the stitched-over substrate area 142 and the stitch open area 144. The latter is the area of stitches corresponding to voids 123. The stitchbonded fabric can be removed from the stitchbonder conventionally as a single piece and wound onto rolls or cut directly into pre-selected shaped pieces. An optional configuration is shown in which the stitchbonded fabric encounters a slitter blade 150. There it is cut to separate segments 152 and 153 of desired pre-selected XD widths. The segments are withdrawn to storage or subsequent processing in direction of arrows 160 and 170, respectively, by conventional equipment, not shown. Each segment is seen to incorporate stitched-over substrate areas and stitch open areas. It has been found that when wide strips are excised from the discontinuous base layer it can be helpful to provide downward pressure on the stitching threads particularly in the stitched open region to cast off the thread from the needles during stitching. Various methods for applying such pressure are well known in the art. For example, the bars can be held down or adjusted to shorter stitching stroke. The illustrated embodiment is meant to be a representative, non-limiting example of the novel product and process.

The preceding disclosure has emphasized the aspect of this invention in which a discontinuous base layer of substrate is stitchbonded such that the combination of stitched-over substrate and stitched open regions provides greater XD extension than provided by the same continuous substrate similarly stitchbonded without stitched open regions being present. The overall fabric hyperextension results largely from the phenomenon that application of cross direction tension causes the least constrained element, that is, the stitched open regions, to stretch without much stretching of the stitched-over substrate regions. This continues with much further applied tension until the stitched open regions reach a limit that depends upon stitch density, stitch pattern, stitching yarn composition and the like. Still further applied tension causes the stitched-over substrate regions to stretch, however these regions are constrained by the innate stretch resistance of the substrate. Further fabric extension under these conditions is similar to that which occurs in conventional stitchbonded fabric wherein the base layer is continuous and stitched open regions are absent. From the foregoing it is observed that the overall XD extension of the novel fabric is owed to a contribution from the high modulus (i.e., stress per unit strain) extension of the stitched open regions and the low modulus extension of the stitched-over substrate regions.

The same principle is believed to apply when the novel stitchbonded fabric is formed by utilizing a base layer of variable density or stitching yarns in a variable stitching density as discussed above. That is, moderated XD extension is achieved because cross direction tension causes the fabric to extend largely in the less dense areas until those areas are nearly fully constrained. Then increased tension causes the fabric in the more dense areas to extend until they are nearly fully constrained. Overall the total extension is between the limits of extension that each of the component stitched over substrate regions would provide by themselves. It is contemplated that this ability to control extension can be very useful to provide highly engineered products such as medical devices.

Figure 8:
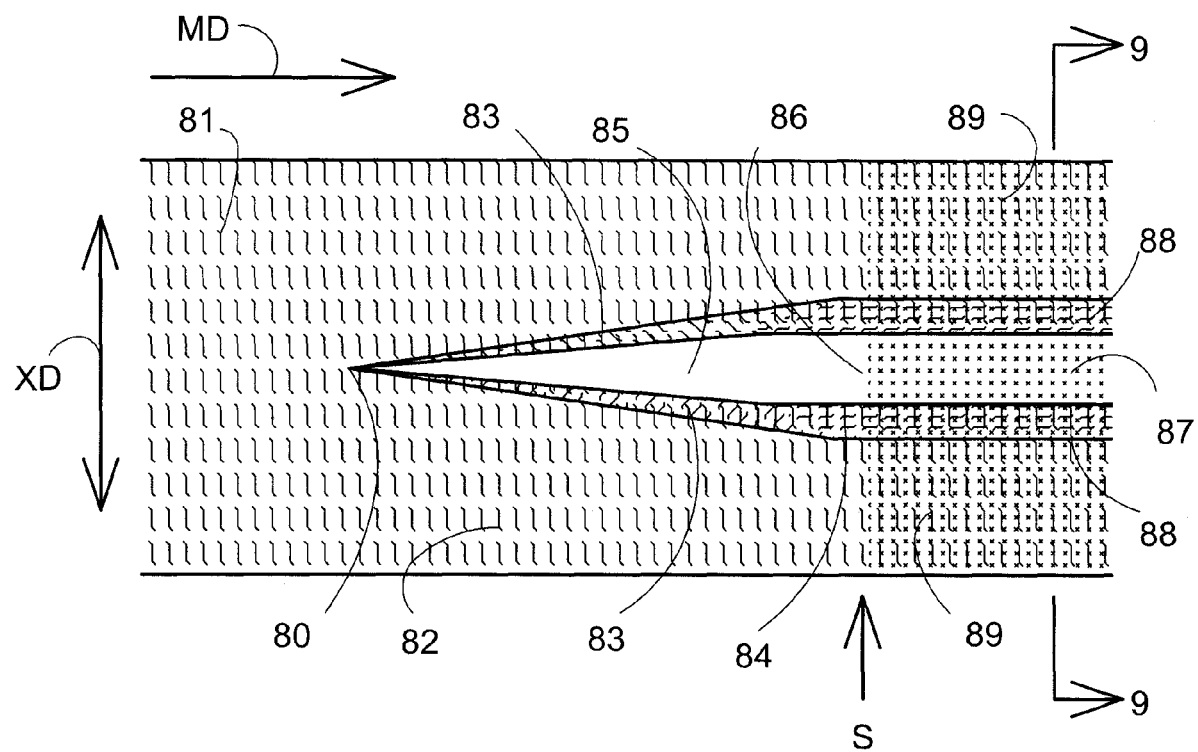
FIG. 8 is a plan schematic view of another embodiment of a stitchbonded fabric according to the present invention.
Figure 9:
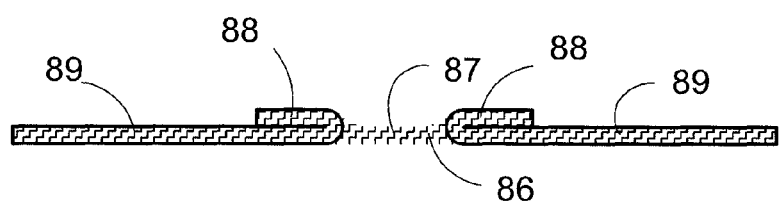
FIG. 9 is an elevation section view of the stitchbonded fabric of FIG. 8 taken through line 9-9.

In yet another aspect, this invention pertains to a fabric having a combination of the heretofore described features. An embodiment in which the novel stitchbonded fabric comprises a discontinuous base layer having substrate and non-substrate areas further in which the substrate areas optionally have different densities. is illustrated schematically in FIG. 8. A base layer 81 of a fabric substrate 82 is seen to be continuous initially as fed in the MD and has substantially uniform density in the XD. The base layer is slit as it progresses in the MD at point 80 by a knife blade (not shown). The two lips 83 of the cut substrate fabric are forced upward and outward in the XD as the base layer advances in the MD. This shaping of the the lips can be accomplished with a flared curvature tool positioned downstream of the blade, by forcing the lips upward against a low ceiling of the stitchbonding machine throat or other conventional techniques. The lips thus fold over onto the substrate to form a double layer thickness of substrate fabric 84 on each side of the slit. The area 85 between the two lips is thus devoid of substrate material and renders the base layer discontinuous as it moves forward. The arrow labeled S indicates the relative machine direction position at which the discontinuous substrate with lips folded over begins to travel under the the stitchbonding bars. At this point a pattern of stitches 86 is stitched across the full width of the base layer in the XD. The stitchbonding results in an embodiment of the novel fabric having a central stitched open region 87 flanked on both sides by first stitched-over substrate regions 88 and farther outward second stitched-over substrate regions 89. As seen best in FIG. 9, stitched-over substrate region 88 comprises a double layer of the substrate material 82 folded onto itself and stitchbonded, while stitched-over substrate region 89 has a single layer of substrate material. The presently described embodiment provides the advantage relative to the embodiment shown in FIG. 6 that only a single knife blade is utilized instead of two per strip. Also this technique does not produce the tails 128, 129 of stripped substrate material and thereby utilizes the substrate material effectively and reduces scrap material and waste disposal costs. Although FIGS. 8 and 9 show the fabric produced by a single slitting blade, it is contemplated that more than one blade in the XD can be utilized to form multiple corresponding stitched open regions.

Still another very simple, easily implemented and highly effective method of creating stitchbonded fabrics with a discontinuous base layer has been developed. The preferred method includes continuously feeding a unitary, integrated web of substrate material to a stitchbonding machine. As the web is being fed it is maintained in a state of underfeed tension in the MD. That is, an MD tensile force is applied to the web. Any conventional technique for producing the tension can be used. Typically the underfeed tension is induced by unwinding the web from its supply roll at a linear feed rate that is slightly less than the take-up rate of the stitchbonded product on the discharge side of the stitchbonding machine. While in this state of tension and before the stitchbonding threads are stitched through the substrate, the web of substrate is ruptured. The tension in the MD causes web contraction the XD at the rupture site. More specifically, the web on either side of the rupture site contracts in the XD away from the point of rupture. Thus the rupture under tension causes the substrate to automatically and instantaneously create a gap moving downstream from the rupture site toward the needle bars of the stitchbonding machine. The gap-containing substrate continues into the stitchbonding machine in which stitching of the stitchbonding threads across the expanse of the now discontinuous base layer occurs such that stitching yarns penetrate substrate material on both sides of the created gap and seamlessly across the open space of the gap itself.

Figure 10:
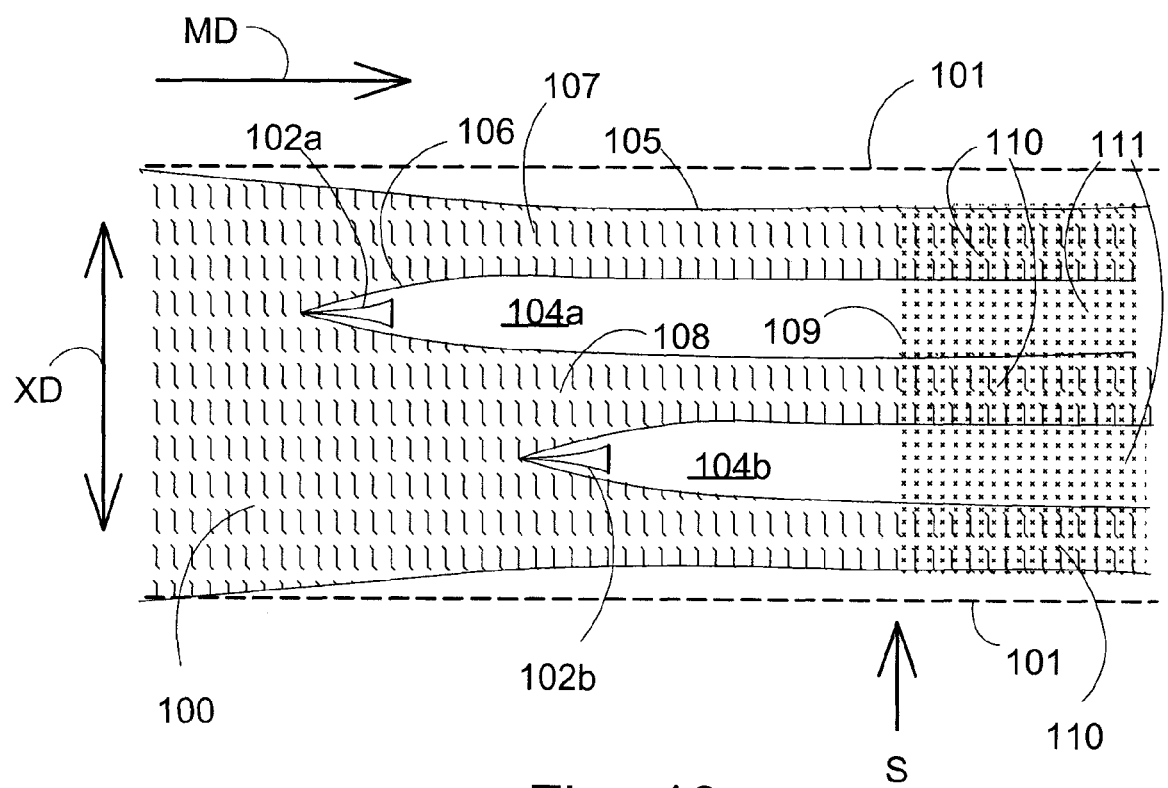
FIG. 10 is a plan schematic view of the novel stitchbonded fabric being fabricated according to a preferred method in which the web is fed to the stitchbonding machine in a state of underfeed tension and ruptured prior to stitchbonding.

This embodiment can be better understood with reference to FIG. 10. The figure shows a plan view of a unitary and integrated web 100 of substrate material being fed in the MD direction. By "unitary and integrated" is meant that the web is a single entity capable of being fed to the stitchbonding machine as a unit. The unitary and integrated web can be uniformly intact as shown at 100. Optionally, the unitary and integrated web can contain voids such as open space(s) between yarns and pre-formed perforations. Also, several independent strips of individually unitary and integrated substrate webs positioned alongside each other in the XD can be fed simultaneously to a single stitchbonding machine although the figure illustrates only a single unitary and integrated web 100.

The web is in a state of underfeed tension that causes the web to contract in the XD direction. XD direction contraction is sometimes referred to as "necking in". This phenomenon is shown in the figure by web outer border 105 that moves laterally toward the central axis of the moving web. The inwardly deflecting border 105 thus deviates from the straight path that the outer edge of the substrate would otherwise have taken had the web been fed under no or negligible tension. The untensioned outer border path is indicated by dashed line 101 to show the necking in of the substrate material.

A rupturing instrument 102a such as a stationary knife blade is positioned to pierce the web 100. After rupturing, the web splits to two substrate regions 107 and 108 on opposite sides of the blade. Also these substrate regions "neck in". For example, the edge 106 of the ruptured web moves laterally away in the XD from the knife blade and the width of the substrate region 107 defined by the XD dimension between border 105 and edge 106 diminishes within a short distance downstream of the knife blade and then attains a steady state, uniform width. The necking in phenomenon produces a gap 104a between substrate regions 107 and 108. The figure makes evident that unlike the previously described embodiments, a single blade is able to create a discontinuous base layer with strips of substrate material set apart in the XD from each other by a gap of empty space.

This preferred method of parting the substrate material by slitting the material under tension and before stitching can be accomplished with those substrate materials that have the tendency to neck-in under tension applied perpendicularly to the neck-in direction. This parting effect can occur in fibrous substrate materials when the fiber or yarn network includes cross-directional or obliquely directed yarns or fibers that tend to align in the machine direction upon application of MD tension. This alignment causes a narrowing in the XD. Substrate materials of this type include for example nonwovens with multidirectional fiber orientations, especially entangled nonwovens such as spunlaced nonwovens or needle-punched nonwovens, and knit fabrics. Polymeric films can also exhibit this necking-in effect under tension. Thus slitting while applying MD tension to such substrate materials induces the edges of the slits to move away from each other as the substrate necks-in. The novel method relies on the slit edges to be parted such that the strips of substrate material on opposite sides of the slits arrive at the stitching station separate from each other by an open area.

The amount of necking in and accordingly the width of the open space between substrate regions depends upon numerous factors including the amount of underfeed tension and the stretching capacity of the substrate material just described.

One of ordinary skill in the art given the knowledge of this disclosure should have no difficulty in adjusting operating conditions to produce a gap of desired dimensions without undue experimentation. Typically the necking in on one side of a rupturing instrument will be about 0.25 to about 3 inches, hence this procedure is usually able to produce open spaces in the substrate web of about 0.5 to about 6 inches wide. Following the rupture and separation of the substrate regions, the web continues to feed into the stitchbonding machine. Stitches 109 of stitchbonding threads are schematically indicated to begin at MD position "S". The novel stitchbonded fabric product with stitched over substrate areas 110 and stitched open areas 111 as described above is thus produced.

The figure also illustrates that optionally multiple rupturing instruments such as second knife blade 102b can be deployed to generate additional XD gaps (e.g., 104b). All the rupture points can be at the same MD position or they can be displaced in the MD from other each other as shown in FIG. 10. Other conventional cutting tools can be used as the rupturing instruments such as wires, flames, laser beams, rotary saws to name a few. In a particularly preferred embodiment, one or more blades can be mounted on a jig proximate to the throat of the stitchbonding machine and brought into contact with the unitary and integrated substrate web either continously or intermittently. For example multiple blades can be affixed pointing outwardly from the surface of a cylindrical rotating drum in contact with the web such that the blades repeatedly approach, penetrate and recede from the web. Each penetration causes a discrete gap in the web having a leading tip, a length in the MD, and a following tip where the web reforms a unitary and integrated form as the blade recedes. This and other similar rupturing tool configurations can produce a wide variety of discontinuous base layer conformations and many interesting and useful stitchbonded fabric product variations.

Other techniques in the field of making stitchbonded fabrics can be used in combination with the basic aspect of this invention (i.e., utilizing a base layer having regions of differentiated physical properties). For example, non-uniformly threaded stitching bar patterns may be used as well as uniformly threaded stitching bar patterns may be employed to stitch the regionally diversified substrate. That is, more stitching threads may be used in some MD bands than in other MD bands. The conditions of width of substrate regions, presence or absence of stitched open areas, densities of different substrate regions and variability of stitching bar threading can all be utilized in combination to obtain a controlled amount of stretch or other physical property that is different from the stretch or physical property achieved conventionally by stitchbonding a uniform continuous substrate.

EXAMPLES

This invention is now illustrated by examples of certain representative embodiments thereof, wherein all parts, proportions and percentages are by weight unless otherwise indicated. The entire disclosures of U.S. patents named in the following examples are hereby incorporated by reference herein. Conventional warp-knitting stitch nomenclature is used herein to identify the various stitch patterns employed in stitching fabrics.

Example 1

A web of random open fibrous substrate material was formed by carding 2 denier polyester fibers of 1.5 inch cut length and bonding with a powder resin. The web had a basis weight of 0.7 oz./yd$^2$. Four, 36 inch wide rolls of the web were mounted on a single shaft with ½ inch axial spacing between the rolls. The rolls were simultaneously fed and stitched on a stitching machine with two bars of which the front bar stitched in a 0-1, 1-0, 1-2, 1-2 ripple stitch pattern a combination yarn of a 70 denier spandex fiber airjet covered with 40 denier of 13 filament textured nylon. The combination yarn was capable of 250% elastic stretch. The back bar stitched a 1-0, 1-2 pattern with a 70 denier 34 filament yarn of textured polyester. Stitching counts were 11 per inch in the machine directions and 14 per inch in the cross direction.

Stitching extended across the full width of the rolls including the gaps between rolls. Thus was generated a continuous unitary web of fabric 145.5 inches wide in the cross direction having four 36 inch wide bands of stitched-over substrate regions and a ½ inch wide band of stitched open region sandwiched between bands of stitched-over substrate regions. The transition zones in the cross direction between stitched-over substrate regions and adjacent stitched open regions were seamless. That is, there were no abrupt surface irregularities or gathering of bulked fabric that otherwise would be expected by joining lengths of fabric using such techniques as sewing or gluing.

Pairs of slitting knives were place in the path of fabric downstream of the stitchbonding machine such that knives of each pair were positioned equidistantly from the machine direction centerline of a stitched open band the stitched open bands. Thus the fabric taken off the machine was continuously cut to strips of set widths, each strip having two outer bands of stitched-over substrate region and a seamlessly-joined, central narrow band of stitched open region.

Cross direction elongation of the product was determined as follows. A pair of the slitting knives was set 12 inches apart and a product sample was obtained. After allowing the sample fabric to relax, it was cut to a specimen of 2 inches in the machine direction. The specimen was marked with a pair of lines in the machine direction spaced apart by 10 inches and positioned centrally in the cross direction such that the ½ inch×2 inch band of stitched open region was disposed centrally in the specimen. The specimen was suspended from one narrow end and a 500 g weight was hung from the opposite end. The distance between marks under load was measured and the elongation was determined as percentage increase in mark distance relative to the initial, no-load distance. Elongation of Example 1 product was 58.4%.

Basis weight of the product was determined as follows. The stitchbonded fabric coming off the stitching machine was fully tensioned. By "fully tensioned" is meant that the tension force was effective to elongate the fabric in the machine direction and cross direction to provide the respective as-stitched counts. That is, in this example, the MD elongation gave 11 counts per inch in that direction and the XD elongation gave 14 counts per inch in that direction. At a location where the fabric was fully tensioned, a template was used to mark a 12 in.×12 in. square area with one of the ½ inch wide bands of stitched open region passing through it. The section of fabric containing the marked area was removed from the stitching machine. Then the marked area was cut out and weighed. Basis weight of Example 1 product was 1.8 oz./yd.$^2$.

Elongation of a control sample of conventionally stitchbonded comparison fabric was determined. A uniformly structured band of excess stitchbonded fabric having only stitched-over substrate region (no stitched open region present) after relaxation was cut with shears to a specimen of 2 inches in machine direction and 12 inches in the cross direction. The specimen was subjected to the elongation measurement test as above. Elongation of the control sample fabric was 45%. The basis weight of the control fabric was 1.88 oz./yd.². Hence, seamless incorporation of a stitched open band increased cross direction elongation by 30% with negligible change in basis weight.

Example 2

The procedure of Example 1 was repeated except that the rolls were spaced apart by 1 inch on the stitching machine feed shaft. Elongations under load and no load conditions were measured as above. Example 2 exhibited a cross direction elongation of 68% (i.e., 50% greater than that of the control sample).

Example 3

The procedure of Example 1 was repeated except that in addition to spacing rolls of substrate web apart by ½ inches, strips of substrate web were cut out of selected feed stock upstream of the stitching needles. That is, slitting knives were placed about 3.6 inch and 4.1 inch in the XD from one side of a roll spacing gap. The strip of substrate web cut out by the knife pair was removed before the fabric entered the needle stitching operation. Hence the web feeding into the machine included in the cross direction, a band of substrate, a ½ inch gap-between-rolls, 3.6 inch wide band of substrate, a second ½ inch wide open strip and a wide band of substrate. After stitching, a 12 in. wide sample was cut from the product such that it contained, in order in the XD, a 3.6 in. wide stitched-over substrate band, a ½ in. wide stitched open band, a 3.6 in. wide stitched-over substrate band, a ½ in. wide stitched open band, and a 3.6 in. stitched-over area. The elongation test sample was cut as in Example 1 with the stitched over region bands being placed centrally within the 10" marks (i.e., 2.6 in. stitched-over substrate/0.5 in. stitched open band/3.6 in. stitched-over substrate/0.5 in. stitched open band/2.6 in. stitched-over substrate). The cross direction elongation of this example was 63% (i.e., 40% greater than the control.

Example 4

The procedure of Example 1 was repeated except that a substrate web material of spunbonded polypropylene filaments was substituted for the resin-bonded, carded polyester substrate material. The web was made of continuously spun, approximately 0.9-1.5 denier fibers laid down in somewhat random fashion to create a sheet. The sheet was then fully bonded with a hot roll calender. The basis weight of the spunbonded web was 0.75 oz./sq.². After stitchbonding spaced apart rolls of the spunbonded polypropylene substrate as in Example 1, the cross direction elongation was 35%. A control sample of the spunbonded polypropylene stitchbonded without gaps separating the rolls exhibited a cross direction elongation of less than 5%.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A stitchbonded fabric defining a machine direction and a cross machine direction perpendicular to the machine direction, comprising (A) a base layer defining a base layer area and comprising (i) a first region comprising a first substrate material which exhibits a first elongation under a specific tension, and (ii) a second region coplanar with the first region and which exhibits a second elongation under the specific tension that is substantially different from the first elongation, and (B) a stitching pattern of threads multi-needle stitched throughout the base layer in rows of stitches running in the machine direction, the rows being spaced apart in the cross direction, in which each of the regions has an area greater than 0.5 percent of the base layer area.

2. The stitchbonded fabric of claim 1 in which the second elongation is at least 10% greater than the first elongation.

3. The stitchbonded fabric of claim 2 in which the first region and the second region each independently have a thickness and the thickness of the first region is different from the thickness of the second region.

4. The stitchbonded fabric of claim 1 in which the first substrate material is a film or a foil.

5. The stitchbonded fabric of claim 1 in which the first substrate material is a web comprising fibers of textile decitex.

6. The stitchbonded fabric of claim 1 in which the transition between the first region and the second region is seamless.

7. A stitchbonded fabric defining a machine direction and a cross machine direction perpendicular to the machine direction, comprising (A) a base layer comprising (i) a first region comprising a first substrate material which exhibits a first elongation under a specific tension, and (ii) a second region coplanar with the first region and which exhibits a second elongation under the specific tension that is at least 10% greater than the first elongation, and (B) a stitching pattern of threads multi-needle stitched throughout the base layer in rows of stitches running in the machine direction, the rows being spaced apart in the cross direction in which the first region and the second region each independently have a weight and the weight of the first region is different from the weight of the second region.

8. A stitchbonded fabric defining a machine direction and a cross direction perpendicular thereto, the fabric being formed by the process comprising the steps of (A) providing one or more webs of substrate materials each of the webs exhibiting an elongation under a specific tension, (B) forming a base layer defining a base layer area and comprising coplanar regions in which one or more of the regions comprises at least one of said webs such that the elongation of at least one region is different from that of a second region, (C) providing threads to be stitched into the base layer, and (D) multi-needle stitching throughout the extent of the base layer with at least one pattern of the threads in rows of stitches running in a machine direction and spacing the rows apart in a cross direction, thereby forming the stitchbonded fabric in which each of the regions has an area greater than 0.5 percent of the base layer area.

9. The stitchbonded fabric of claim 8 in which at least one web is a fabric comprising fibers of textile decitex.

10. The stitchbonded fabric of claim 8 in which at least one web is a film or a foil.

11. A process for making a stitchbonded fabric comprising the steps of (A) continuously feeding into a multi-needle stitching machine a base layer defining a base layer area and comprising one or more webs of substrate material such that the base layer is segmented into regions each of the webs exhibiting an elongation under specific tension, and such that the value of the elongation of at least one region is substantially different from that of another region, and (B) multi-needle stitching throughout the extent of the base layer in rows of stitches running in the machine direction, the rows being spaced apart in a cross direction perpendicular to the machine direction, thereby producing the stitchbonded fabric in which each of the regions has an area greater than 0.5 percent of the base layer area.

12. The process of claim 11 in which one or more webs is a fabric comprising fibers of textile decitex.

13. The process of claim 11 in which one or more webs is a film or a foil.

14. A stitchbonded fabric defining a machine direction and a cross machine direction perpendicular to the machine direction, comprising (A) a base layer defining a base layer area and comprising (i) a first region comprising a first substrate material which exhibits a value of a physical property selected from the group consisting of abrasion resistance, surface friction and compression resistance, and (ii) a second region coplanar with the first region and which exhibits another value of the physical property quantitatively substantially different from that of the first substrate material, and (B) a stitching pattern of threads multi-needle stitched throughout the base layer in rows of stitches running in the machine direction, the rows being spaced apart in the cross direction in which each of the regions has an area greater than 0.5 percent of the base layer area.

15. A stitchbonded fabric defining a machine direction and a cross machine direction perpendicular to the machine direction, comprising (A) a base layer comprising (i) a first region comprising a first substrate material which exhibits physical properties, and (ii) a second region coplanar with the first region and which exhibits at least one physical property quantitatively substantially different from a corresponding physical property of the first substrate material, and (B) a stitching pattern of threads multi-needle stitched throughout the base layer in rows of stitches running in the machine direction, the rows being spaced apart in the cross direction in which the first substrate material is a web comprising fibers of textile decitex, and in which the second region comprises a second substrate material of a web comprising fibers of textile decitex.

16. The stitchbonded fabric of claim 15 in which the first substrate material and the second substrate material are each independently a nonwoven fibrous web and one of said nonwoven fibrous webs has a basis weight of at most about 0.3 oz./sq. yd.

17. The stitchbonded fabric of claim 15 in which at most one of said webs is present in each region.

18. The stitchbonded fabric of claim 15 in which a plurality of said webs is present in at least one region.

19. A stitchbonded fabric defining a machine direction and a cross machine direction perpendicular to the machine direction, comprising (A) a base layer comprising (i) a first region comprising a first substrate material which exhibits physical properties, and (ii) a second region devoid of substrate material and coplanar with the first region, and (B) a stitching pattern of threads multi-needle stitched throughout the base layer in rows of stitches running in the machine direction, the rows being spaced apart in the cross direction, and in which the stitching pattern through the first substrate material defines at least one stitched over substrate area, in which the stitching pattern through the second region defines at least one stitched open area, and in which the stitchbonded fabric stretches in the cross direction at least 20% greater than the stretch of the stitched over substrate area.

20. The stitchbonded fabric of claim 19 in which the base layer comprises a plurality of elongated regions of first substrate material defining sides extending in the machine direction and positioned in the cross direction such that the fabric has a stitched open area between two stitched-over substrate areas.

21. The stitchbonded fabric of claim 20 which consists essentially of one stitched open area sandwiched in the cross direction between two stitched-over substrate areas.

22. The stitchbonded fabric of claim 20 in which the stitched-over substrate areas are non-uniformly wide in the cross direction.

23. The stitchbonded fabric of claim 19 in which the base layer comprises at most one region of substrate material and a plurality of mutually isolated, non-substrate regions which are positioned such that every cross direction section of the fabric passes through at least one stitched-open area.

24. The stitchbonded fabric of claim 19 in which the threads are stretchable at least 100% and are elastic.

25. The stitchbonded fabric of claim 24 in which the threads comprise spandex.

26. A stitchbonded fabric defining a machine direction and a cross direction perpendicular thereto, the fabric being formed by the process comprising the steps of (A) providing one or more webs of substrate materials, (B) forming a discontinuous base layer comprising coplanar regions in which one or more of the regions comprises at least one of said webs such that a physical property of at least one region is different from that of a second region and in which at least one region is devoid of substrate material thereby defining a non-substrate region, (C) providing threads to be stitched into the base layer, and (D) multi-needle stitching throughout the extent of the base layer with at least one pattern of the threads in rows of stitches running in a machine direction and spacing the rows apart in a cross direction, thereby forming the stitchbonded fabric and stitching the threads through the non-substrate region thereby defining at least one stitched open area of the fabric, and in which the non-substrate region has a width effective to provide the stitchbonded fabric with stretch in the cross direction at least 15% greater than stretch in the cross direction of the stitched-over substrate area.

27. The stitchbonded fabric of claim 26 in which the base layer comprises a plurality of independent substrate regions continuously extensive in the machine direction and spaced apart in the cross direction such that a non-substrate region extending continuously in the machine direction is positioned in the cross direction between two adjacent substrate regions.

28. The stitchbonded fabric of claim 26 in which the process of forming the fabric comprises providing a continuously operating multi-needle stitching machine, providing to an entrance of the stitching machine an elongated piece of the web having two outboard edges along the machine direction, at the entrance slitting the piece at one or more positions intermediate the outboard edges thereby forming a continuous strip of the web having a width in the cross direction, removing the strip from the piece of web and then continuously feeding the web without the strip into the stitching machine.

29. The stitchbonded fabric of claim 26 in which the process of forming the fabric comprises providing a continuously operating multi-needle stitching machine, providing an elongated piece of the web having two outboard edges along the machine direction, removing from the web discrete portions thereby creating mutually isolated excised areas positioned intermediate the outboard edges and such that all cross direction sections of the web intersect with at least one excised area, and then continuously feeding the piece of web into the stitching machine.

30. A process for making a stitchbonded fabric comprising the steps of
   (A) continuously feeding into a multi-needle stitching machine a base layer comprising one or more webs of substrate material such that the base layer is segmented into regions having at least one characteristic physical property, and such that the value of the characteristic physical property of at least one region is substantially different from that of another region, and
   (B) multi-needle stitching throughout the extent of the base layer in rows of stitches running in the machine direction, the rows being spaced apart in a cross direction perpendicular to the machine direction, thereby producing the stitchbonded fabric
   in which at least one of the regions of the base layer is devoid of substrate material such that the multi-needle stitching forms stitched-over substrate area where the stitches are in regions of the substrate material and the multi-needle stitching forms stitched open area where the stitches are in regions devoid of substrate material and in which the stitched open area is of size effective to provide the stitchbonded fabric with stretch in the cross direction at least 15% greater than stretch in the cross direction of the stitched-over substrate area.

31. A process for making a stitchbonded fabric comprising the steps of
   (A) continuously feeding into a multi-needle stitching machine a base layer comprising one or more webs of substrate material such that the base layer is segmented into regions having at least one characteristic physical property, and such that the value of the characteristic physical property of at least one region is substantially different from that of another region, and
   (B) multi-needle stitching throughout the extent of the base layer in rows of stitches running in the machine direction, the rows being spaced apart in a cross direction perpendicular to the machine direction, thereby producing the stitchbonded fabric
   which comprises continuously supplying to the stitching machine a web of nonwoven fabric of fibers of textile decitex, slitting the web prior to the stitching step to separate at least one strip of the web from the base layer, diverting the strip from the stitching step and feeding the residual base layer into the stitching step.

32. A process for making a stitchbonded fabric comprising the steps of
   (A) continuously feeding into a multi-needle stitching machine a base layer comprising one or more webs of substrate material such that the base layer is segmented into regions having at least one characteristic physical property, and such that the value of the characteristic physical property of at least one region is substantially different from that of another region, and
   (B) multi-needle stitching throughout the extent of the base layer in rows of stitches running in the machine direction, the rows being spaced apart in a cross direction perpendicular to the machine direction, thereby producing the stitchbonded fabric
   which comprises continuously supplying to the stitching machine a web of substrate material comprising substantially nonbonded fibers of textile decitex, removing discrete portions of the substrate material creating mutually isolated areas devoid of substrate material positioned in the web and thereby forming a discontinuous base layer prior to the stitching step, and feeding the discontinuous base layer into the stitching machine.

33. A process for making a stitchbonded fabric comprising the steps of
   (A) continuously feeding into a multi-needle stitching machine a base layer comprising one or more webs of substrate material such that the base layer is segmented into regions having at least one characteristic physical property, and such that the value of the characteristic physical property of at least one region is substantially different from that of another region, and
   (B) multi-needle stitching throughout the extent of the base layer in rows of stitches running in the machine direction, the rows being spaced apart in a cross direction perpendicular to the machine direction, thereby producing the stitchbonded fabric
   which comprises providing a plurality of rolls of webs of substrate material, spacing the rolls axially apart in the cross machine direction such that at least one gap is present between adjacent webs, continuously and simultaneously unwinding the rolls and feeding the spaced apart webs to the stitching machine, and stitching across the webs and gap to form the stitchbonded fabric.

34. A mattress cover comprising a skirt comprising a stitchbonded fabric defining a machine direction and a cross machine direction perpendicular to the machine direction, the stitchbonded fabric comprising
   (A) a base layer comprising (i) a first region comprising a first substrate material which exhibits a first elongation under a specific tension, and (ii) a second region coplanar with the first region and which exhibits a second elongation under the specific tension that is substantially different from the first elongation, and
   (B) a stitching pattern of threads multi-needle stitched throughout the base layer in rows of stitches running in the machine direction, the rows being spaced apart in the cross direction,
which skirt exhibits a cross direction stretch of at least 20%.

* * * * *